(12) United States Patent
Zhang et al.

(10) Patent No.: US 11,734,945 B2
(45) Date of Patent: Aug. 22, 2023

(54) DISPLAY MODULE AND DISPLAY DEVICE (71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jian Zhang, Beijing (CN); Cai Zheng, Beijing (CN); Tingting Zhao, Beijing (CN); Litao Fan, Beijing (CN); Yingxue Yu, Beijing (CN); Jinzhao Zhou, Beijing (CN); Qin Xin, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 427 days.

(21) Appl. No.: 16/977,490

(22) PCT Filed: Dec. 16, 2019

(86) PCT No.: PCT/CN2019/125658
§ 371 (c)(1),
(2) Date: Sep. 2, 2020

(87) PCT Pub. No.: WO2021/119923
PCT Pub. Date: Jun. 24, 2021

(65) Prior Publication Data
US 2021/0216741 A1  Jul. 15, 2021

(51) Int. Cl.
*G06V 40/13* (2022.01)
*G02F 1/1333* (2006.01)
(Continued)

(52) U.S. Cl.
CPC ....... *G06V 40/1318* (2022.01); *G02B 6/0055* (2013.01); *G02B 6/0068* (2013.01);
(Continued)

(58) Field of Classification Search
CPC .. G06V 40/1318; G06V 10/143; G06V 10/54; G06V 40/00; G06V 40/13
(Continued)

(56) References Cited

U.S. PATENT DOCUMENTS

| 2018/0025205 A1 | 1/2018 | Wu et al. |
| 2018/0096187 A1* | 4/2018 | Kwon .................. H04M 1/026 |
| 2021/0124199 A1* | 4/2021 | Qing ................. G02F 1/133317 |

FOREIGN PATENT DOCUMENTS

| CN | 109564630 A | 4/2019 |
| CN | 109716352 A | 5/2019 |

(Continued)

OTHER PUBLICATIONS

Extended European Search Report dated Nov. 28, 2022 issued in the corresponding European Patent Application No. 19945398.6.

*Primary Examiner* — Premal R Patel
(74) *Attorney, Agent, or Firm* — McDermott Will & Emery LLP (57) ABSTRACT

A display module includes: a liquid crystal module, a cover plate, and a texture recognition unit. The texture recognition unit includes a first light source and a texture sensing module. The first light source is located at a side of the cover plate proximate to the liquid crystal module, and is configured to emit invisible light. The texture sensing module is located at a side of the liquid crystal module facing away from the cover plate. A light wavelength range of light allowed to pass through the cover plate and the liquid crystal module includes a light wavelength range of the invisible light. The texture sensing module is configured to collect (Continued)

reflected light after the invisible light is irradiated to a target object, so as to identify a texture of the target object.

15 Claims, 11 Drawing Sheets

(51) Int. Cl.
*F21V 8/00* (2006.01)
*G06V 10/143* (2022.01)
*G06V 10/54* (2022.01)
*G06V 40/00* (2022.01)
*G06V 10/147* (2022.01)

(52) U.S. Cl.
CPC ...... *G02F 1/1333* (2013.01); *G02F 1/133331* (2021.01); *G06V 10/143* (2022.01); *G06V 10/147* (2022.01); *G06V 10/54* (2022.01); *G06V 40/00* (2022.01)

(58) Field of Classification Search
CPC .. G06V 10/147; G02B 6/0055; G02B 6/0068; G02F 1/133331; G02F 1/1333
See application file for complete search history.

(56) References Cited

FOREIGN PATENT DOCUMENTS

| | | |
|---|---|---|
| CN | 109901313 A | 6/2019 |
| CN | 109902652 A | 6/2019 |
| CN | 109902664 A | 6/2019 |
| CN | 109977851 A | 7/2019 |
| CN | 110376780 A | 10/2019 |

\* cited by examiner

DISPLAY MODULE AND DISPLAY DEVICE

CROSS-REFERENCE TO RELATED APPLICATION

This application is a national phase entry under 35 USC 371 of International Patent Application No. PCT/CN2019/125658 filed on Dec. 16, 2019, which is incorporated herein by reference in its entirety.

TECHNICAL FIELD

The present disclosure relates to the field of display technologies, and in particular, to a display module and a display device.

BACKGROUND

With the development of science and technology, the application of under-screen fingerprint recognition technology in a mobile display device may increase functions of the mobile display device, and also conducive to increase a screen-to-body ratio of the mobile display device.

SUMMARY

In an aspect, a display module is provided. The display module includes: a liquid crystal module, a cover plate, and a texture recognition unit. The texture recognition unit includes a first light source and a texture sensing module. The first light source is located at a side of the cover plate proximate to the liquid crystal module, and is configured to emit invisible light. The texture sensing module is located at a side of the liquid crystal module facing away from the cover plate. A light wavelength range of light allowed to pass through the cover plate and the liquid crystal module includes a light wavelength range of the invisible light. The texture sensing module is configured to collect reflected light after the invisible light is irradiated to a target object, so as to identify a texture of the target object.

In some embodiments, the display module further includes a side-type backlight module. The side-type backlight module includes: a second light source, a light guide plate, a reflective sheet, and at least one optical film. The light guide plate is located at the side of the liquid crystal module facing away from the cover plate. The second light source is located at a side face of the light guide plate, and is configured to emit visible light. The at least one optical film is located at a side of the light guide plate proximate to the liquid crystal module, and a light wavelength range of light allowed to pass through the at least one optical film includes the light wavelength range of the invisible light and a light wavelength range of the visible light. The reflective sheet is located at a side of the light guide plate facing away from the liquid crystal module, and is configured to reflect the visible light and transmit the invisible light. The texture sensing module is located at a side of the reflective sheet facing away from the light guide plate.

In some embodiments, the liquid crystal module has a display area. Orthographic projections of the first light source and the second light source on the cover plate are located outside a same side of a boundary of an orthographic projection of the display area on the cover plate along a direction parallel to the cover plate.

In some embodiments, the side-type backlight module further includes a back plate. The back plate is located at a side of the reflective sheet proximate to the texture sensing module. A portion of the back plate opposite to the texture sensing module has an opening, and the opening allows the reflected light after the invisible light is irradiated to the target object to pass therethrough and to be irradiated to the texture sensing module.

In some embodiments, the liquid crystal module has a display area. An orthographic projection of the opening on the cover plate is within an orthographic projection of the display area on the cover plate.

In some embodiments, the liquid crystal module includes a chip on film. The first light source is disposed on a surface of the chip on film proximate to the cover plate, and is electrically connected to the chip on film.

In some embodiments, the display module further includes a printed circuit board. The printed circuit board is located at a side of the liquid crystal module facing away from the cover plate, and is electrically connected to the chip on film.

In some embodiments, the display module further includes an encapsulation frame sealingly connected to the cover plate. The encapsulation frame includes an accommodating groove. The liquid crystal module and the texture recognition unit are located in the accommodating groove. The texture sensing module is disposed on a groove bottom surface of the accommodating groove, and the first light source is disposed on an inner side face of the accommodating groove.

In some embodiments, a light exit surface of the first light source crosses a surface of the cover plate proximate to the liquid crystal module.

In some embodiments, there is an included angle between the inner side face of the accommodating groove configured to be provided with the first light source and the groove bottom surface of the accommodating groove, and the included angle is an obtuse angle.

In some embodiments, the light exit surface of the first light source is perpendicular or approximately perpendicular to the surface of the cover plate proximate to the liquid crystal module.

In some embodiments, the inner side face of the accommodating groove configured to be provided with the first light source is a stepped surface. The first light source is located on a plane of the stepped surface parallel to the groove bottom surface, and a light exit surface of the first light source is parallel to a surface of the cover plate proximate to the liquid crystal module.

In some embodiments, the first light source is adhesively bonded to a surface of the cover plate proximate to the liquid crystal module.

In some embodiments, the first light source includes: a flexible circuit board carrier and at least one invisible light lamp. The at least one invisible light lamp is disposed on the flexible circuit board carrier and is electrically connected to the flexible circuit board carrier.

In some embodiments, the display module further includes a printed circuit board. The printed circuit board is located at a side of the liquid crystal module facing away from the cover plate, and is electrically connected to the texture sensing module.

In another aspect, a display device is provided. The display device includes the display module as described in some embodiments above.

BRIEF DESCRIPTION OF THE DRAWINGS

In order to explain technical solutions in some embodiments of the present disclosure more clearly, the accompanying drawings used in some embodiments of the present disclosure will be introduced briefly. Obviously, the accompanying drawings to be described below are merely some illustrative embodiments of the present disclosure, and a person of ordinary skill in the art can obtain other drawings according to these drawings.

DETAILED DESCRIPTION

Technical solutions in embodiments of the present disclosure will be described clearly and completely in combination with the accompanying drawings in some embodiments of the present disclosure. Obviously, the described embodiments are merely some but not all of the embodiments of the present disclosure. All other embodiments obtained on the basis of the embodiments of the present disclosure by a person of ordinary skill in the art shall be included in the protection scope of the present disclosure.

Unless the context requires otherwise, in the entire description and the claims, the term "comprise/include" and other forms thereof such as the third-person singular form "comprises/includes" and the present participle form "comprising/including" are construed as an open and inclusive meaning, i.e., "included, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any or more embodiments/examples in any suitable manner.

Hereinafter, the terms such as "first" and "second" are only used for descriptive purposes and are not to be construed as indicating or implying the relative importance or implicitly indicating the number of indicated technical features below. Thus, features defined as "first" and "second" may explicitly or implicitly include one or more of the features. In the description of the embodiments of the present disclosure, the term "a/the of plurality of" means two or more unless otherwise specified.

Currently, liquid crystal display devices represented by the liquid crystal display (LCD) have occupied a certain position in the field of display, since they have advantages of lightness, low power consumption, no radiation, good color purity, and high contrast. Moreover, a display device with a high screen-to-body ratio has also become one of the products favored by consumers for its distinctive look. Therefore, the application of under-screen fingerprint recognition technology in a liquid crystal display device may not only increase functions of the liquid crystal display device, and also conducive to increase a screen-to-body ratio of the liquid crystal display device.

Based on this, some embodiments of the present disclosure provide a display module to be applied to the liquid crystal display device, thereby realizing under-screen texture recognition of the liquid crystal display device.

Referring to FIGS. 1 to 9, the display module 100 includes a cover plate 10, a liquid crystal module 20, and a backlight module 30 that are sequentially arranged, and a texture recognition unit. The texture recognition unit includes a first light source 41 and a texture sensing module 42.

The first light source 41 is located at a side of the cover plate 10 proximate to the liquid crystal module 20, and is configured to emit invisible light. Optionally, the first light source 41 is an infrared light source.

The cover plate 10 is located at a side of the liquid crystal module 20 facing away from the backlight module 30. The cover plate 10 is a light-transmission cover plate, and a light wavelength range of light allowed to pass through the cover plate 10 includes a light wavelength range of the invisible light emitted by the first light source 41, and a light wavelength range of visible light provided by the backlight module 30. Optionally, the cover plate 10 is a light-transmission glass capable of transmitting the invisible light.

The liquid crystal module 20 includes an array substrate 21, an opposite substrate 23, and a liquid crystal layer 22 disposed between the array substrate 21 and the opposite substrate 23. The array substrate 21 and the opposite substrate 23 stick together by a frame sealant, so that the liquid crystal layer 22 is limited within a region enclosed by the frame sealant. Optionally, in a case where a color filter layer is disposed in the opposite substrate 23, the opposite substrate 23 is a color film substrate.

In some examples, the opposite substrate 23 is located at a side of the array substrate 21 proximate to the cover plate 10. The liquid crystal module 20 further includes an upper light-polarizing layer 24 located at a side of the opposite substrate 23 proximate to the cover plate 10, and a lower light-polarizing layer 25 located at a side of the array substrate 21 proximate to the backlight module 30. It will be understood that, the light wavelength range of visible light is from 380 nm to 780 nm, and the light wavelength range of invisible light is quite different from the light wavelength range of the visible light. For example, in a case where the invisible light is infrared light, the light wavelength range thereof is greater than 850 nm. Thus, the upper light-polarizing layer 24 and the lower light-polarizing layer 25 in the liquid crystal module 20 can only polarize visible light, and basically do not cause light loss to invisible light.

Of course, a structure of the liquid crystal module 20 is not limited to this, and some embodiments below schematically illustrate only by taking the liquid crystal module 20 using the above structure as an example. In addition, the liquid crystal module 20 may be any one of a fringe-field switching (FFS) liquid crystal module, an in-plane switching (IPS) liquid crystal module, or a twist nematic (TN) liquid crystal module.

Figure 1:
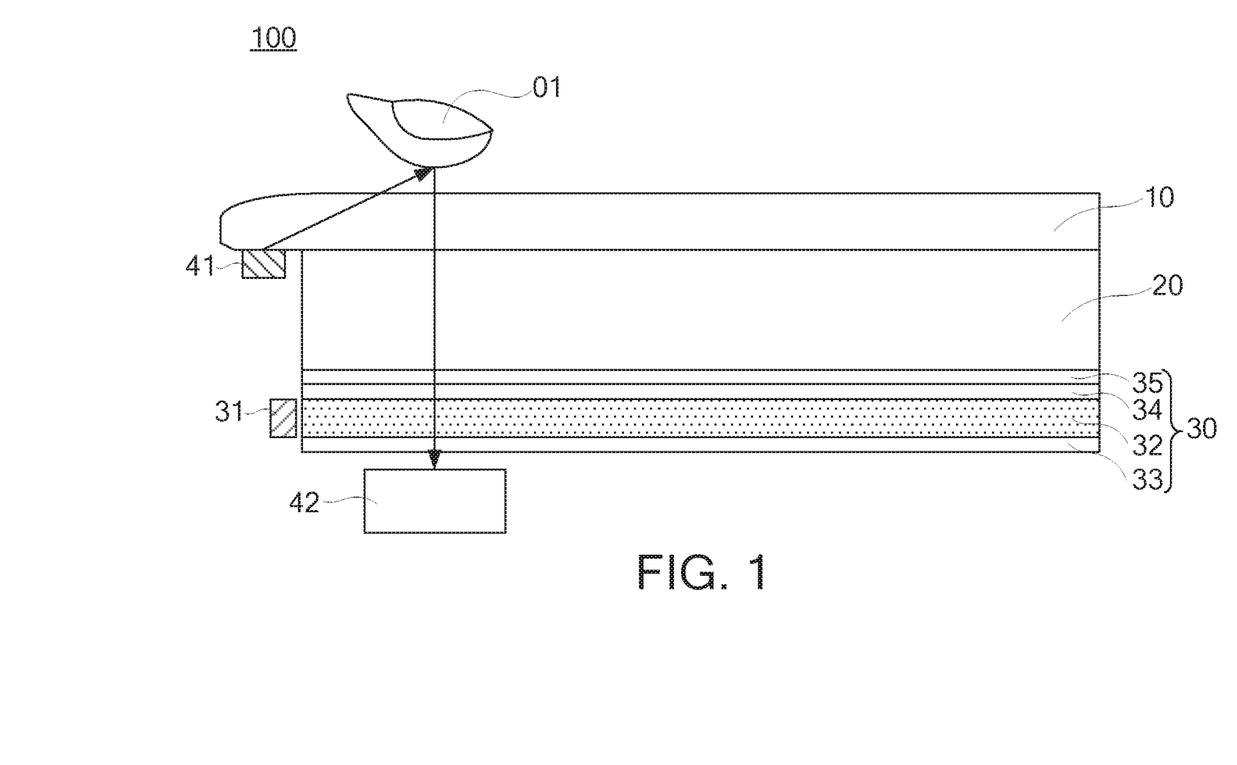
FIG. 1 is a diagram showing a structure of a display module, in accordance with some embodiments of the present disclosure.
Figure 2:
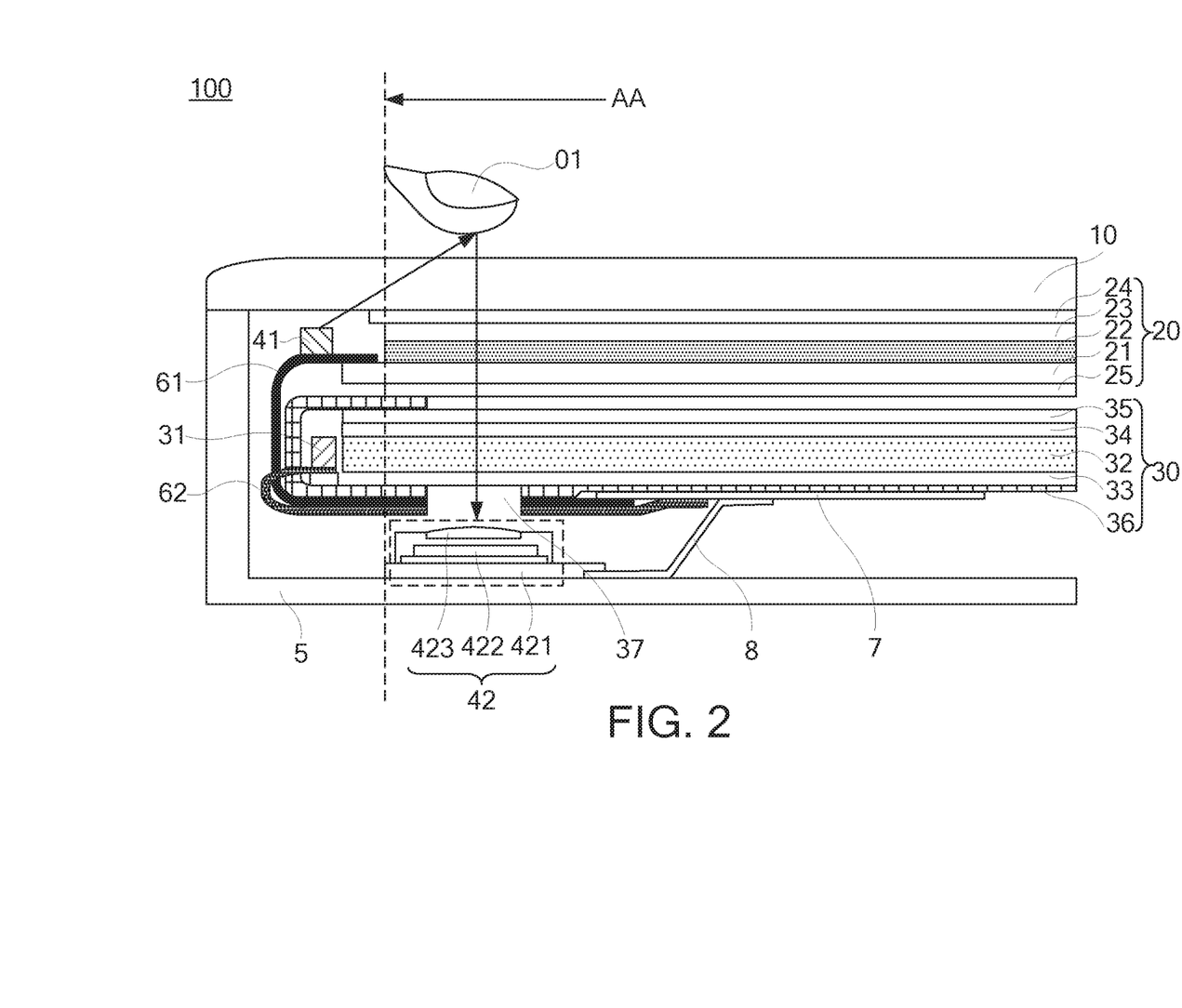
FIG. 2 is a diagram showing a structure of another display module, in accordance with some embodiments of the present disclosure.

The backlight module 30 is configured to provide display a light signal to the liquid crystal module 20. In some examples, the backlight module 30 is a side-type backlight module that includes a second light source 31, a light guide plate 32, a reflective sheet 33, and at least one optical film. As shown in FIG. 2, the light guide plate 32 is located at a side of the liquid crystal module 20 facing away from the cover plate 10. The second light source 31 is located at a side face of the light guide plate 32, and is configured to emit visible light. Optionally, the second light source 31 is a light-emitting diode (LED) light bar that includes at least one LED.

The at least one optical film is located at a side of the light guide plate 32 proximate to the liquid crystal module 20, and a light wavelength range of light allowed to pass through the at least one optical film includes the light wavelength range of the invisible light emitted by the first light source 41 and a light wavelength range of the visible light emitted by the second light source 31. Optionally, the at least one optical film includes two optical films, and the two optical films include a diffusion film 34 and a composite brightness enhancement film 35 that are sequentially stacked on the side of the light guide plate 32 proximate to the liquid crystal module 20. Here, materials of the diffusion film 34 and the composite brightness enhancement film 35 may be selectively set according to actual needs, so long as they can transmit the invisible light emitted by the first light source 41 and the visible light emitted by the second light source 31.

The reflective sheet 33 is located at a side of the light guide plate 32 facing away from the liquid crystal module 20, and is configured to reflect the visible light emitted by the second light source 31, and to transmit the invisible light emitted by the first light source 41. That is, the reflective sheet 33 not only has a function of reflecting the visible light emitted by the second light source 31, but also can transmit the invisible light emitted by the first light source 41. Optionally, in a case where the first light source 41 is an infrared light source, the reflective sheet 33 is an infrared transflective sheet. Reflectivity of the infrared transflective sheet to the visible light at 380 nm to 780 nm is proximate to 100%, and transmittance of the infrared transflective sheet to infrared light is proximate to 90%, so that in a case where the reflectivity of the infrared transflective sheet to the visible light is not affected, the infrared transflective sheet can have a characteristic of good infrared transmission characteristics.

In a case where the backlight module 30 has the above structure, reflected light after the invisible light emitted by the first light source 41 is irradiated to a target object can easily pass through the backlight module 30 with almost no interference, for example, it will not be scattered by the optical film, or not blocked by the reflective sheet 33, so as to ensure its completeness, thereby achieving accurate recognition of the texture information of the target object.

The texture sensing module 42 is located at a side of the liquid crystal module 20 facing away from the cover plate 10. For example, in a case where the display module 100 has the above structure, the texture sensing module 42 is located at a side of the reflective sheet 33 in the backlight module 30 facing away from the light guide plate 32. The texture sensing module 42 is configured to collect the reflected light after the invisible light emitted by the first light source 41 is irradiated to the target object, so as to recognize a texture of the target object.

It will be understood that, the target object in some embodiments above may be a finger, a palm, or other target object with a texture, and is not limited in the embodiments of the present disclosure. The texture sensing module 42 is configured to recognize the texture of the target object. The texture sensing module 42 may be a fingerprint sensing module or a palmprint sensing module, etc., which may be selectively set according to actual needs.

In the following, it takes the target object being a finger 01 and the texture sensing module 42 being a fingerprint sensing module as an example for a schematic description.

Figure 11:
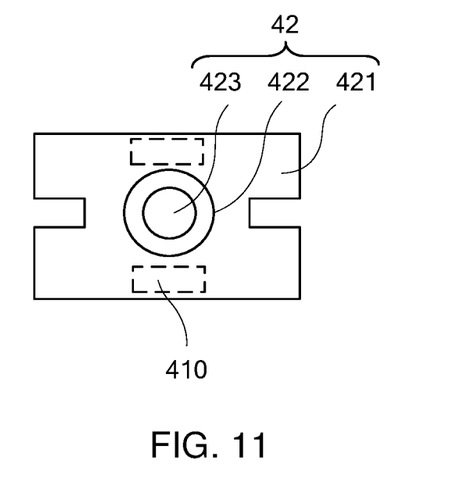
FIG. 11 is a diagram showing a structure of a texture sensing module, in accordance with some embodiments of the present disclosure.

The texture sensing module 42 is disposed to match with the first light source 41. In some examples, the first light source 41 is an infrared light source, and the texture sensing module 42 is a lens-type infrared fingerprint sensing module. Referring to FIGS. 2 and 11, the lens-type infrared fingerprint sensing module at least includes an infrared sensor 422, an infrared lens 423 and a first circuit board 421. The infrared lens 423 is located at a light incident side of the infrared sensor 422, and the infrared sensor 422 is electrically connected to the first circuit board 421. The infrared lens 423 is capable of filtering light of other wavelength range other than the infrared light, thereby preventing the light of other wavelength range from interfering with a collection of light signals of the infrared sensor 422. In a case where the display module 100 further includes a printed circuit board (abbreviated as PCB) 7, the first circuit board 421 may be electrically connected to the printed circuit board 7 through a board-to-board connector (abbreviated as BTB connector) 8. In this way, single-point fingerprint recognition may be effectively realized by using the lens-type infrared fingerprint sensing module, which also has advantages of low cost, small size of the module, and high sensitivity.

In these embodiments of the present disclosure, after the invisible light emitted by the first light source 41 passes through the cover plate 10 and is irradiated to the finger 01, light reflected by valleys of the fingerprint of the finger 01 and light reflected by ridges of the fingerprint of the finger 01 have different light intensities. After passing through the cover plate 10, the liquid crystal module 20, and the backlight module 30 in sequence, the reflected light can be irradiated into the texture sensing module 42 to be collected by the texture sensing module 42, so that the texture sensing module 42 can form a texture image that is alternately dark and light in color according to the reflected light. The first light source 41 is located at the side of the cover plate 10 proximate to the liquid crystal module 20, so that the invisible light emitted by the first light source 41 only needs to pass through the backlight module 30 one time during a process from being emitted to being collected by the texture sensing module 42, thereby preventing the backlight module 30 from interfering with transmission of the invisible light, which may effectively improve the utilization of the invisible light. Thus, a clear fingerprint image may be formed, which is conducive to improve a success rate of fingerprint recognition. In addition, in these embodiments of the present disclosure, the texture recognition unit is located under a screen of the display module 100, which is conducive to increase the screen-to-body ratio of the display module 100.

In some embodiments, referring to FIGS. 2, 3, 5, 7 and 9, the liquid crystal module 20 has a display area AA and a peripheral region on at least one side of the display area AA. Orthographic projections of the first light source 41 and the second light source 31 on the cover plate 10 are located outside a same side of a boundary of an orthographic projection of the display area AA on the cover plate 10 along a direction parallel to the cover plate 10. That is to say, the first light source 41 and the second light source 31 are located on a same side of the liquid crystal module 20 along the direction parallel to the cover plate 10.

Here, the invisible light emitted by the first light source 41 and the visible light emitted by the second light source 31 have different light wavelength ranges, that is, the invisible light and the visible light do not interfere with each other. Therefore, disposing the first light source 41 and the second light source 31 on the same side of the liquid crystal module 20 along the direction parallel to the cover plate 10 is beneficial to reducing an area of the peripheral region of the display module 100, thereby further increasing the screen-to-body ratio of the display module 100.

In some embodiments, continuously referring to FIGS. 2, 3, 5, 7 and 9, the backlight module 30 further includes a back plate 36. The back plate 36 is located at a side of the reflective sheet 33 proximate to the texture sensing module 42, and is configured to support other components in the backlight module 30, such as the second light source 31, the light guide plate 32, and the reflective sheet 33.

Optionally, the back plate 36 is a metal back plate. The second light source 31 is electrically connected to the printed circuit board 7 located at a side of the back plate 36 facing away from the second light source 31 through a second circuit board 62 (e.g., a flexible circuit board).

A portion of the back plate 36 opposite to the texture sensing module 42 has an opening 37. A shape and size of the opening 37 may be selectively set according to actual needs, and are not limited in some embodiments of the present disclosure. Optionally, an orthographic projection of the opening 37 on the cover plate 10 overlaps or partially overlaps with an orthographic projection of the texture sensing module 42 on the cover plate 10. In this way, the opening 37 allows the reflected light after the invisible light emitted by the first light source 41 is irradiated to the target object to pass therethrough, and be irradiated to the texture sensing module 42.

In addition, optionally, the orthographic projection of the opening 37 on the cover plate 10 is within the orthographic projection of the display area AA on the cover plate 10, which can effectively increase the screen-to-body ratio of the display module 100.

It should be added that, a light emitting angle of the first light source 41 is limited, therefore, the opening 37 in the back plate 36 is disposed proximate to the first light source 41 along the direction parallel to the cover plate 10, that is, the texture sensing module 42 is disposed proximate to the first light source 41 along the direction parallel to the cover plate 10, which can ensure that the texture sensing module 42 may receive sufficient reflected light of the invisible light.

In some embodiments, referring to FIG. 2, the liquid crystal module 20 includes a chip on film (or chip on flex, both abbreviated as COF) 61. The display module 100 further includes a printed circuit board 7 located at a side of the liquid crystal module 20 facing away from the cover plate 10. One end of the COF 61 is correspondingly bond to a part of the array substrate 21 in the liquid crystal module 20 located in the peripheral region, and another end is electrically connected to the printed circuit board 7, and is configured to realize signal transmission between the printed circuit board 7 and signal lines in the array substrate 21.

The first light source 41 is disposed on a surface of the COF 61 proximate to the cover plate 10, and is electrically connected to the COF 61. Optionally, the first light source 41 is welded to the COF 61. In this way, the first light source 41 can be electrically connected to the printed circuit board 7 through the COF 61, so as to simplify a connection circuit or a connector required by the first light source 41, which is beneficial to lowering the production cost of the display module 100. Moreover, there is no need to consider adding an avoidance space inside the display module 100 to install the first light source 41, thus, the display module 100 has a simple structure and is convenient to be manufactured.

In addition, for example, as shown in FIG. 2, the first light source 41 and the second light source 31 are located at a side of the array substrate 21 in the liquid crystal module 20 where the array substrate 21 is configured to bond the COF 61.

In some other embodiments, referring to FIGS. 3 to 9, the display module 100 further includes an encapsulation frame 5 sealingly connected to the cover plate 10. The encapsulation frame 5 includes an accommodating groove, and the liquid crystal module 20 and the texture recognition unit are located in the accommodating groove.

For example, the texture sensing module 42 is disposed on a groove bottom surface of the accommodating groove of the encapsulation frame 5, and the first light source 41 is disposed on an inner side face of the accommodating groove of the encapsulation frame 5.

Optionally, the texture sensing module 42 is bonded to the groove bottom surface of the accommodating groove of the encapsulation frame 5 through a double sided tape or fixing adhesive. Similarly, the first light source 41 is bonded to the inner side face of the accommodating groove of the encapsulation frame 5 through a double sided tape or fixing adhesive.

Figure 10:
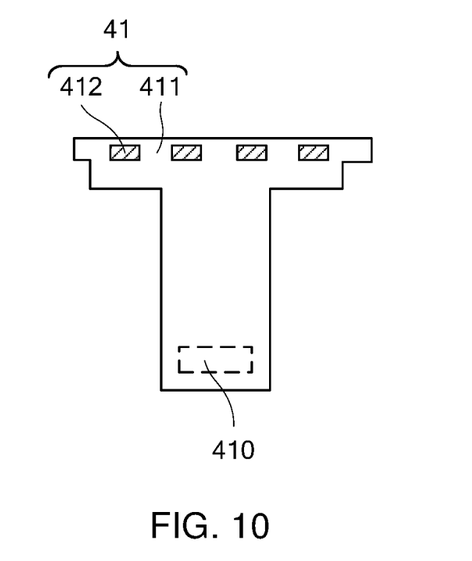
FIG. 10 is a diagram showing a structure of a first light source, in accordance with some embodiments of the present disclosure.

In some embodiments, referring to FIG. 10, the first light source 41 includes a flexible circuit board carrier 411 and at least one invisible light lamp 412. The at least one invisible light lamp 412 is disposed on the flexible circuit board carrier 411 and is electrically connected to the flexible circuit board carrier 411. Optionally, the invisible light lamp 412 is an infrared light-emitting diode (IR LED), such as an IR LED of top light-emitting type. The invisible light lamp 412 is fixed on the flexible circuit board carrier 411 by welding, and each invisible light lamp 412 is electrically connected to the texture sensing module 42 through the flexible circuit board carrier 411.

Here, a shape of the flexible circuit board carrier 411 may be selectively set according to actual needs. For example, as shown in FIG. 10, the flexible circuit board carrier 411 has a T-shaped or approximately T-shaped structure. The at least one invisible light lamp 412 is evenly disposed on a top of the T-shaped structure of the flexible circuit board carrier 411, and a bottom of the T-shaped structure of the flexible circuit board carried 411 is provided with a connecting portion 410 that is configured to be electrically connected to the texture sensing module 42, the BTB connector, or the like. The flexible circuit board carrier 411 is bonded to the corresponding inner side face of the accommodating groove of the encapsulation frame 5 through a double sided tape or fixing adhesive.

Of course, the structure of the first light source 41 is not limited to this. For example, referring to FIGS. 7 and 8, the first light source 41 is an invisible light bar, and the invisible light bar may be electrically connected to the texture sensing module 42 through a third circuit board 63 (e.g., a flexible circuit board).

Figure 12:
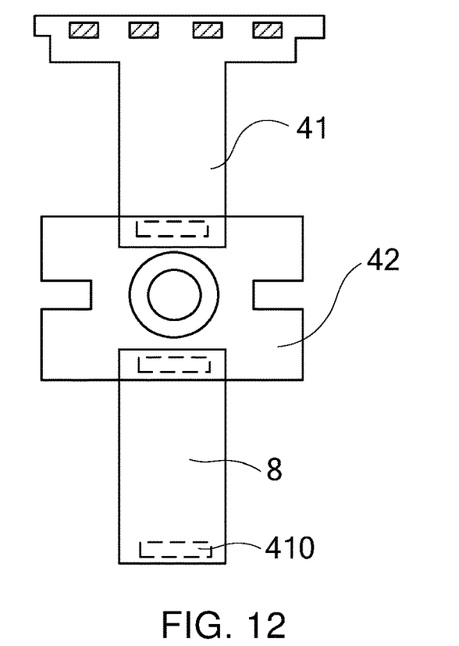
FIG. 12 is a connection diagram of a first light source and a texture sensing module, in accordance with some embodiments of the present disclosure.

Shapes of components in the texture sensing module 42 may be selectively set according to actual needs. Taking the texture sensing module 42 being a lens-type infrared fingerprint sensing module as an example, as shown in FIG. 11, the infrared sensor 422 and the infrared lens 423 each has a circular structure, and the first circuit board 421 has an I-shaped structure. Each of two opposite side edges of the first circuit board 421 is provided with a connecting portion 410. In this way, the first circuit board 421 may be electrically connected to the BTB connector, the flexible circuit board carrier 411 in the first light source 41, or the like by using the connecting portions 410. Their connection manner may be shown by reference to FIG. 12, which will not be detailed here.

In some embodiments above, components electrically connected to the printed circuit board 7, such as the first light source 41, the second light source 31, the texture sensing module 42 and the array substrate 21, all can exchange data with the printed circuit board 7, so as to perform corresponding actions according to control signals sent by the printed circuit board 7, for example, the invisible light lamp 412 in the first light source 41 is controlled to be turned on or off. The embodiments of the present disclosure will not describe this in detail.

The invisible light emitted by the first light source 41 needs to be irradiated to the target object, so as to be reflected by the target object to form a texture light signal. Therefore, there may be many arrangement ways of a light exit surface of the first light source 41 relative to a surface of the cover plate 10.

In some examples, referring to FIGS. 3 to 6, the light exit surface of the first light source 41 crosses a surface of the cover plate 10 proximate to the liquid crystal module 20. That is, there is an included angle between the light exit surface of the first light source 41 and the surface of the cover plate 10 proximate to the liquid crystal module 20. In a case where the first light source 41 includes an IR LED of top light-emitting type, the light exit surface of the first light source 41 is a top surface of the IR LED.

Figure 3:
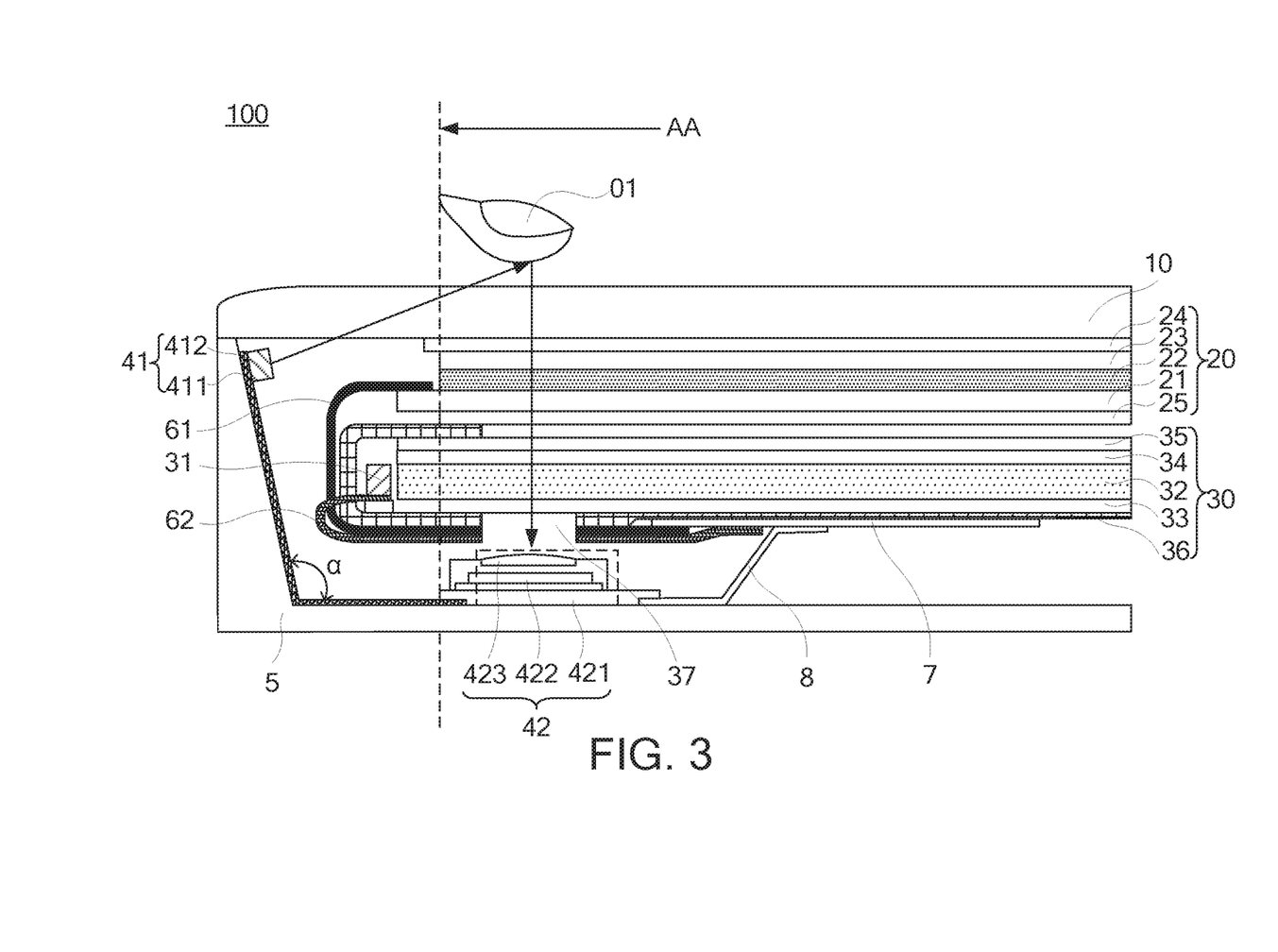
FIG. 3 is a diagram showing a structure of yet another display module, in accordance with some embodiments of the present disclosure.

Optionally, as shown in FIG. 3, there is an included angle α between the inner side face of the accommodating groove of the encapsulation frame 5 configured to be provided with the first light source 41 and the groove bottom surface of the accommodating groove, and the included angle α is an obtuse angle. That is to say, the inner side face of the accommodating groove of the encapsulation frame 5 configured to be provided with the first light source 41 is an inclined surface. After the first light source 41 is fixed on the inner side face, the light exit surface of the first light source 41 is also an inclined surface, and an included angle between the light exit surface of the first light source 41 and the surface of the cover plate 10 proximate to the liquid crystal module 20 is equal to $\pi - \alpha$.

The included angle α is related to a light emitting angle of the invisible light lamp 412 in the first light source 41, but factors affecting it are not limited to this. For example, a thickness of the display module 100, and relative positions of the first light source 41 and the texture sensing module 42, all will affect the included angle α. In some examples, the light emitting angle of the invisible light lamp 412 in the first light source 41 is 120°, and the included angle α between the inner side face of the accommodating groove of the encapsulation frame 5 configured to be provided with the first light source 41 and the groove bottom surface of the accommodating groove satisfies that: the included angle α is greater than or equal to 120° and is less than or equal to 150° (i.e., $120° \leq \alpha \leq 150°$). In some other examples, the light emitting angle of the invisible light lamp 412 in the first light source 41 is 140°, and the included angle α between the inner side face of the accommodating groove of the encapsulation frame 5 configured to be provided with the first light source 41 and the groove bottom surface of the accommodating groove satisfies that: the included angle α is greater than or equal to 110° and is less than or equal to 160° (i.e., $110° \leq \beta \leq 160°$).

Figure 4:
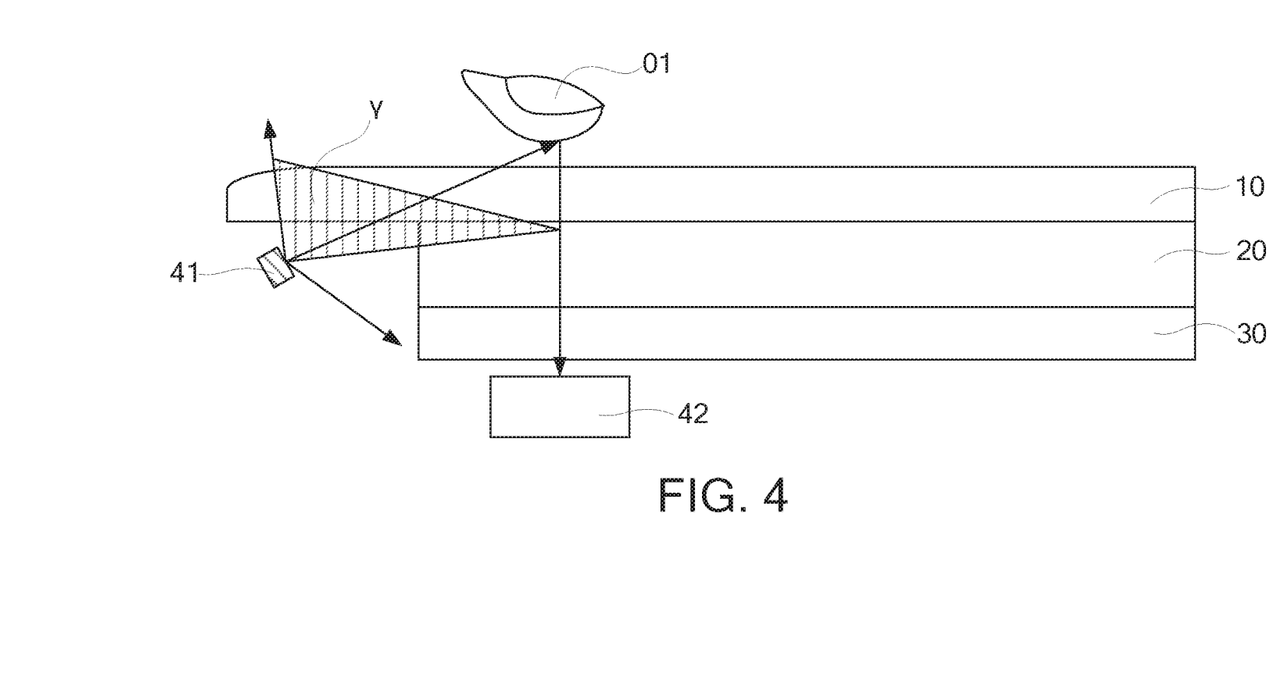
FIG. 4 is a schematic diagram of an effective light emitting angle of a first light source, in accordance with some embodiments of the present disclosure.

In a case where the included angle α is an obtuse angle, as shown in FIG. 4, most of the invisible light emitted by the first light source 41 can be effectively irradiated to the target object such as the finger 01, which is beneficial to improving the utilization of the invisible light, thereby improving the accuracy of texture recognition of the target object.

Figure 5:
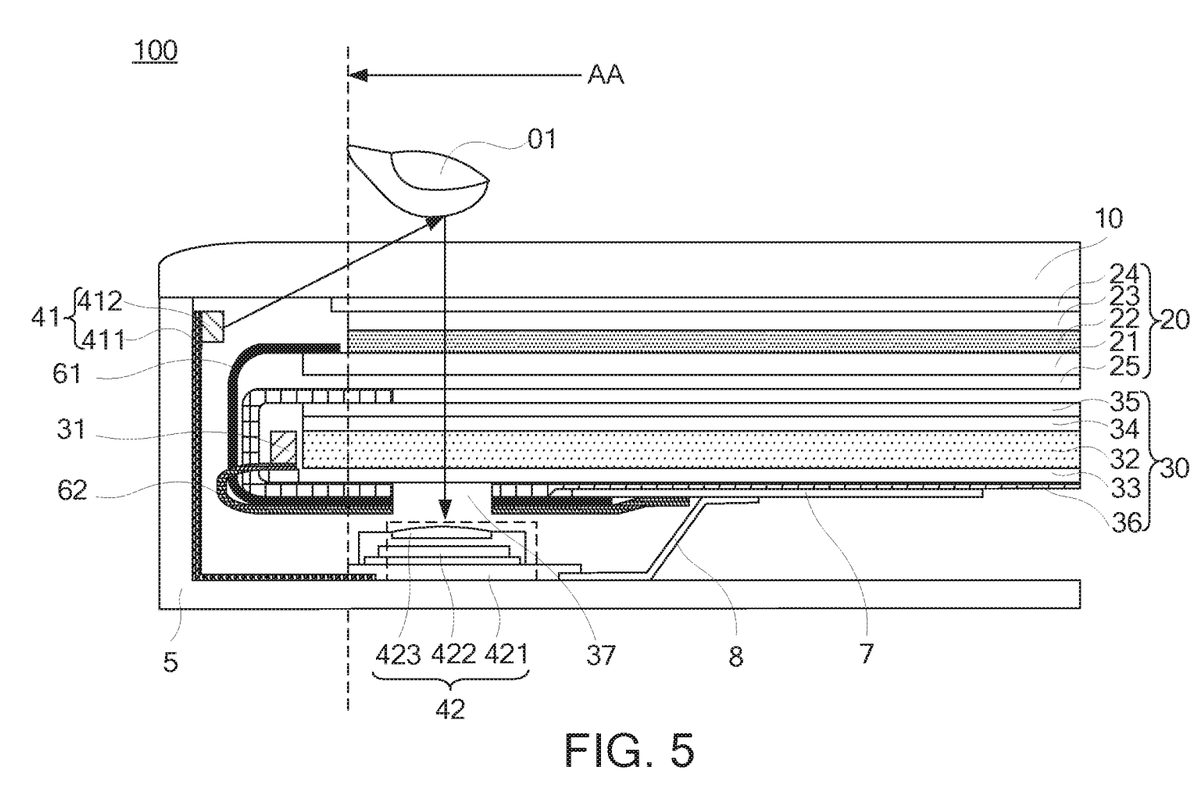
FIG. 5 is a diagram showing a structure of yet another display module, in accordance with some embodiments of the present disclosure.
Figure 6:
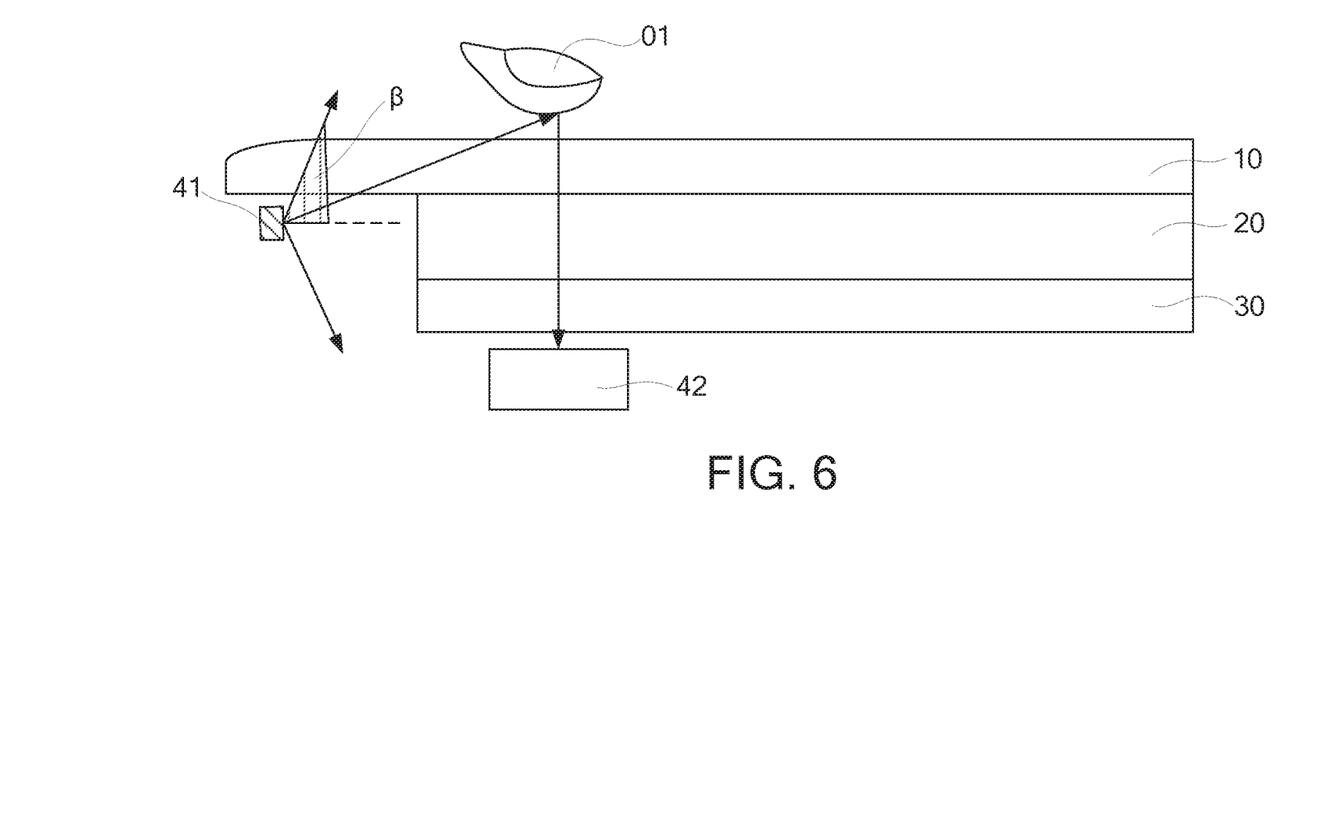
FIG. 6 is a schematic diagram of an effective light emitting angle of another first light source, in accordance with some embodiments of the present disclosure.

Of course, as shown in FIGS. 5 and 6, the light exit surface of the first light source 41 is perpendicular or approximately perpendicular to the surface of the cover plate 10 proximate to the liquid crystal module 20, which is also allowed. For example, as shown in FIGS. 5 and 6, the first light source 41 includes an IR LED of top light-emitting type. The top surface of the IR LED is perpendicular or approximately perpendicular to the surface of the cover plate 10 proximate to the liquid crystal module 20. An effective light emitting angle β of the invisible light (i.e., an included angle of the invisible light that can be effectively irradiated to the target object such as the finger 01) emitted by the IR LED is half of its light emitting angle. Since a thickness of the IR LED is very small, such a setting can effectively reduce a distance from a corresponding edge of the cover plate 10 to the display area AA, that is, it can effectively reduce the peripheral region on a corresponding side of the display module 100, thereby increasing the screen-to-body ratio of the display module 100.

Figure 7:
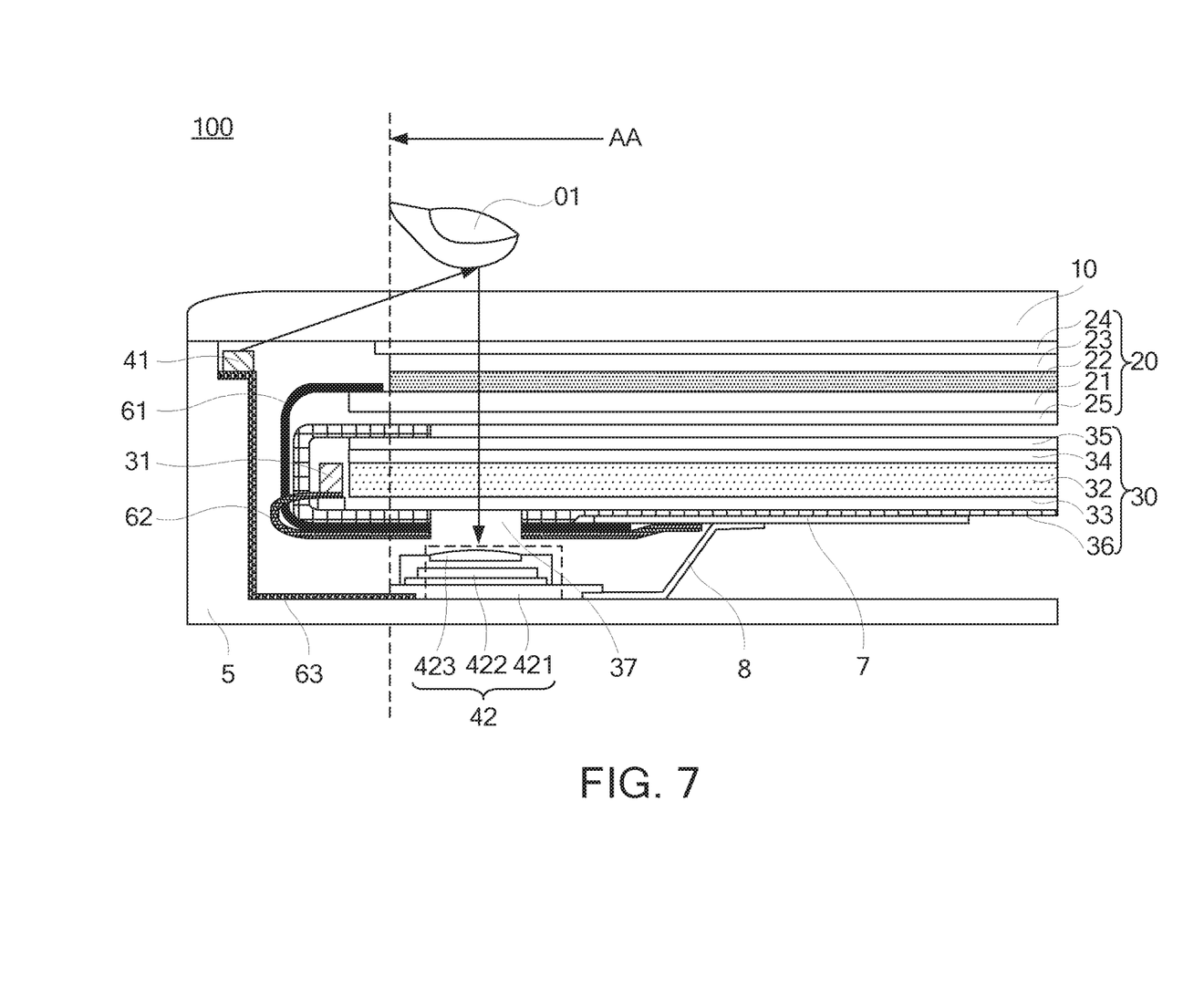
FIG. 7 is a diagram showing a structure of yet another display module, in accordance with some embodiments of the present disclosure.

In addition, the first light source 41 may be disposed in the display module 100 in other ways. For example, as shown in FIG. 7, the inner side face of the accommodating groove of the encapsulation frame 5 configured to be provided with the first light source 41 is a stepped surface. The first light source 41 is located on a plane of the stepped surface of the accommodating groove parallel to a surface of the groove bottom surface of the accommodating groove, and the light exit surface of the first light source 41 is parallel to the surface of the cover plate 10 proximate to the liquid crystal module 20.

Figure 8:
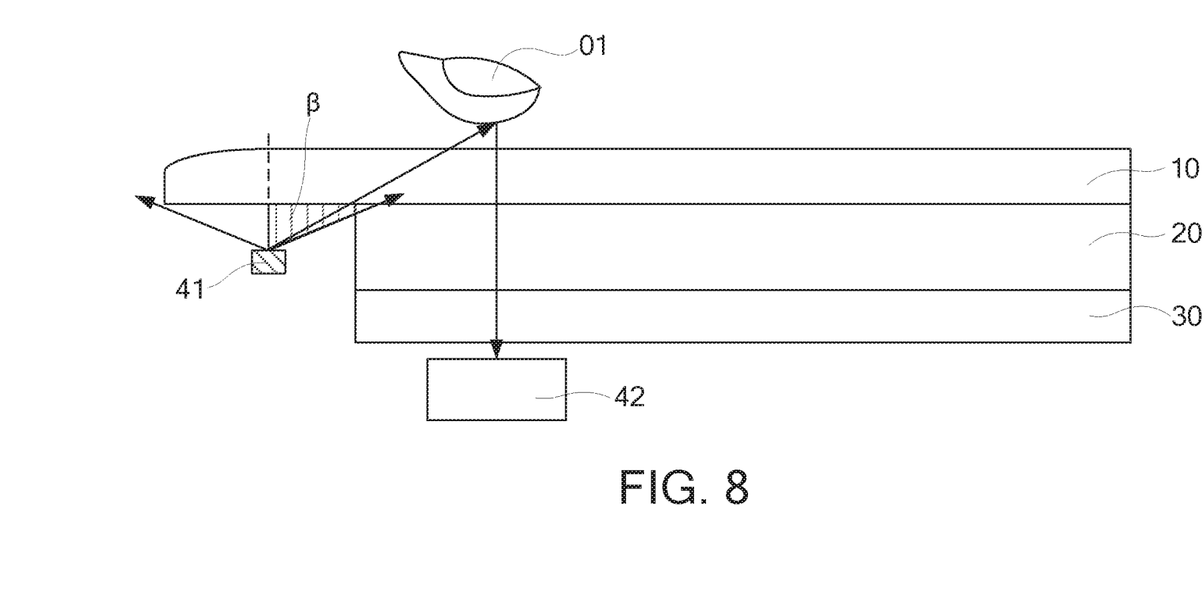
FIG. 8 is a schematic diagram of an effective light emitting angle of yet another first light source, in accordance with some embodiments of the present disclosure.

For example, as shown in FIGS. 7 and 8, the first light source 41 includes an IR LED of top light-emitting type. The top surface of the IR LED is parallel to the surface of the cover plate 10 proximate to the liquid crystal module 20. The effective light emitting angle β of the invisible light emitted by the IR LED is half of its light emitting angle. In this way, it is convenient to realize the design and manufacturing of the display module 100, which is beneficial to improving the production efficiency of the display module 100.

Figure 9:
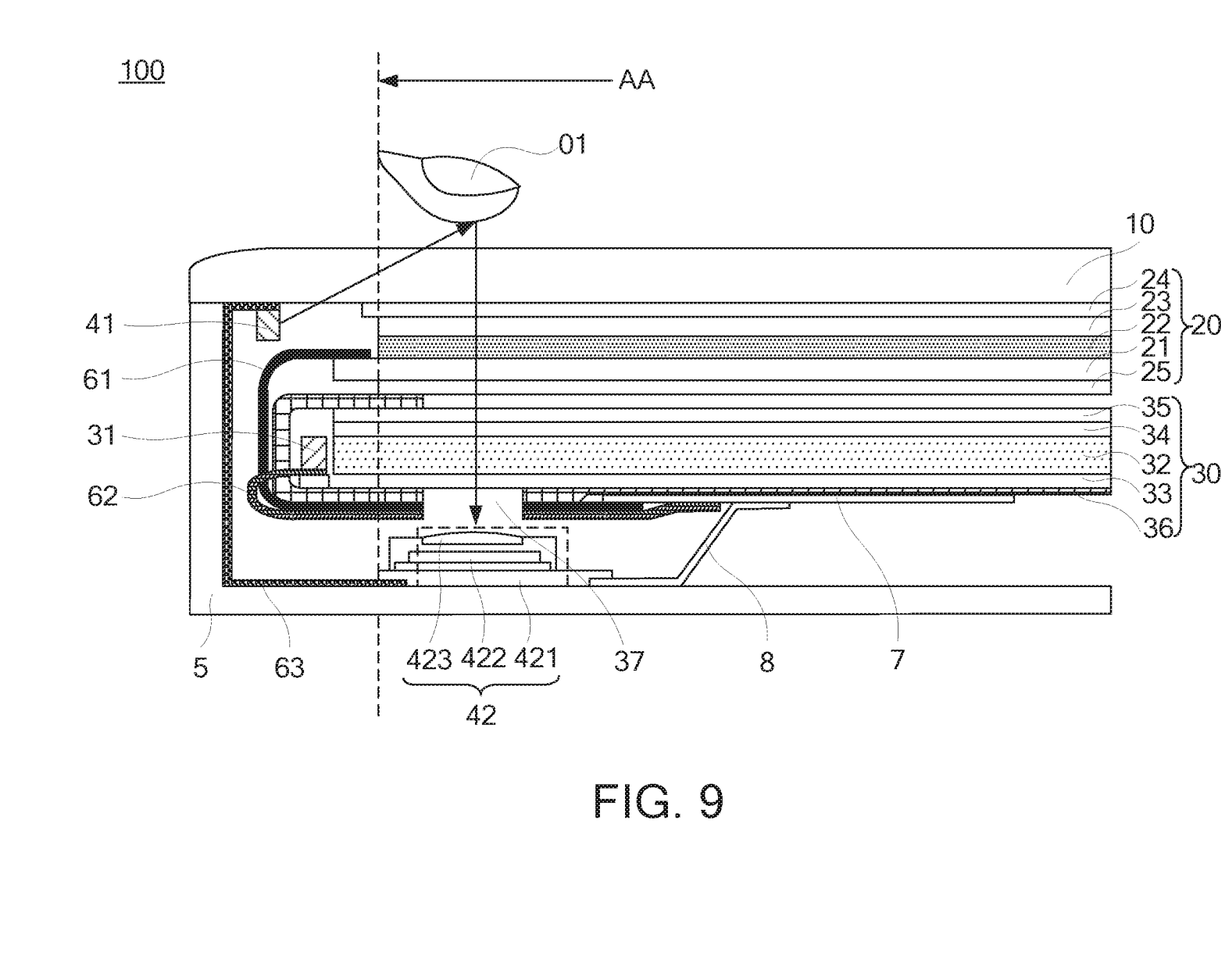
FIG. 9 is a diagram showing a structure of yet another display module, in accordance with some embodiments of the present disclosure.

In yet other embodiments, referring to FIG. 9, the first light source 41 is adhesively bonded to the surface of the cover plate 10 proximate to the liquid crystal module 20. Optionally, the first light source 41 is bonded to the cover plate 10 through a double sided tape or fixing adhesive. In this way, there is no need to design a complicated structure of the encapsulation frame 5 of the display module 100. For example, an avoidance space is not needed to be reserved on the inner side face of the encapsulation frame 5 to install the first light source 41, and the structure of the encapsulation frame 5 is simple and easy to be implemented.

Continuously referring to FIG. 9, the first light source 41 is adhesively bonded at the surface of the cover plate 10 proximate to the liquid crystal module 20, and is electrically connected to the printed circuit board 7 through a second circuit board 63 (e.g., a flexible circuit board). The second circuit board 63 (e.g., a flexible circuit board) may be fixed on the corresponding inner side face of the encapsulation frame 5, for example, by adhesively bonding.

Figure 13:
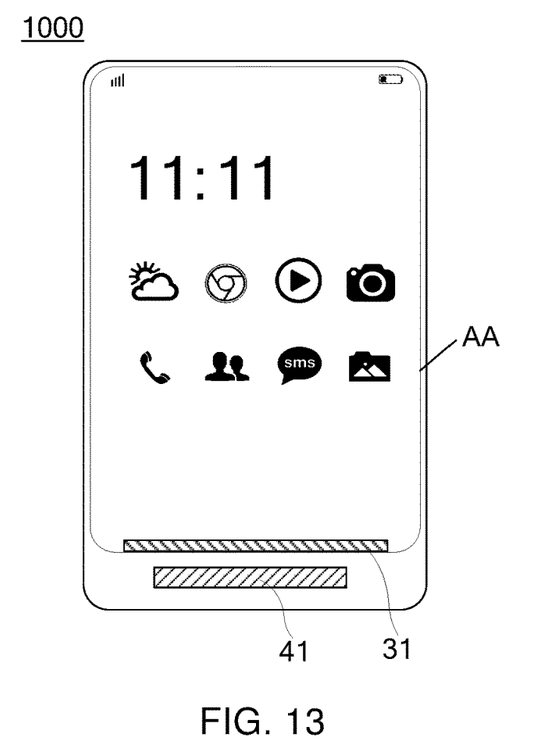
FIG. 13 is a schematic diagram of a display device, in accordance with some embodiments of the present disclosure.

Some embodiments of the present disclosure provide a display device. As shown in FIG. 13, the display device 1000 includes the display module 100 as described in some embodiments above. The beneficial effects achieved by the display device provided by the embodiments of the present disclosure are the same as the beneficial effects achieved by the display module provided by some embodiments above, which will not be described herein again.

The display device provided by some embodiments of the present disclosure may be any device that is applied to the field of display and displays an image whether moving (e.g., a video) or fixed (e.g., a still image), and whether literal or graphical. More specifically, it is anticipated that the described embodiments may be implemented in a plurality of electronic devices, and the plurality of the electronic devices may include but be not limit to: mobile phones, wireless devices, personal digital assistant (abbreviate to PDA), hand-held or portable computers, global positioning system (GPS) receivers/navigators, cameras, MP4 (MPEG-4 Part 14) video players, vidicons, TV monitors, flat panel displays, computer monitors and aesthetic structures (e.g., a display for displaying an image of a piece of jewelry) etc.

In the description of the above embodiments, specific features, structures, materials, or characteristics may be combined in any suitable manner in any one or more embodiments or examples.

The foregoing descriptions are merely specific implementation manners of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A display module, comprising: a liquid crystal module, a cover plate, a texture recognition unit and a side-type backlight module; wherein
the texture recognition unit includes:
a first light source, located at a side of the cover plate proximate to the liquid crystal module, and configured to emit invisible light; and
a texture sensing module, located at a side of the liquid crystal module facing away from the cover plate;
wherein a light wavelength range of light allowed to pass through the cover plate and the liquid crystal module includes a light wavelength range of the invisible light; and the texture sensing module is configured to collect reflected light after the invisible light is irradiated to a target object, so as to identify a texture of the target object;
wherein the side-type backlight module includes:
a light guide plate, located at a side of the liquid crystal module facing away from the cover plate;
a second light source, located at a side face of the light guide plate, and configured to emit visible light;
at least one optical film, located at a side of the light guide plate proximate to the liquid crystal module, and a light wavelength range of light allowed to pass through the at least one optical film includes the light wavelength range of the invisible light and a light wavelength range of the visible light; and
a reflective sheet, located at a side of the light guide plate facing away from the liquid crystal module, and configured to reflect the visible light and transmit the invisible light;
wherein the texture sensing module is located at a side of the reflective sheet facing away from the light guide plate.

2. The display module according to claim 1, wherein the liquid crystal module has a display area; and
orthographic projections of the first light source and the second light source on the cover plate are located outside a same side of a boundary of an orthographic projection of the display area on the cover plate along a direction parallel to the cover plate.

3. The display module according to claim 1, wherein the side-type backlight module further includes:
a back plate, located at a side of the reflective sheet proximate to the texture sensing module;
wherein a portion of the back plate opposite to the texture sensing module has an opening, and the opening allows the reflected light after the invisible light is irradiated to the target object to pass therethrough, and to be irradiated to the texture sensing module.

4. The display module according to claim 3, wherein the liquid crystal module has a display area; and
an orthographic projection of the opening on the cover plate is within an orthographic projection of the display area on the cover plate.

5. The display module according to claim 1, wherein the liquid crystal module includes a chip on film; and
the first light source is disposed on a surface of the chip on film proximate to the cover plate, and is electrically connected to the chip on film.

6. The display module according to claim 5, further comprising a printed circuit board; wherein
the printed circuit board is located at a side of the liquid crystal module facing away from the cover plate, and is electrically connected to the chip on film.

7. The display module according to claim 1, further comprising an encapsulation frame sealingly connected to the cover plate; wherein
the encapsulation frame includes an accommodating groove; and
the liquid crystal module and the texture recognition unit are located in the accommodating groove; wherein the texture sensing module is disposed on a groove bottom surface of the accommodating groove, and the first light source is disposed on an inner side face of the accommodating groove.

8. The display module according to claim 7, wherein a light exit surface of the first light source crosses a surface of the cover plate proximate to the liquid crystal module.

9. The display module according to claim 8, wherein there is an included angle between the inner side face of the accommodating groove configured to be provided with the first light source and the groove bottom surface of the accommodating groove, and the included angle is an obtuse angle.

10. The display module according to claim 8, wherein the light exit surface of the first light source is perpendicular or approximately perpendicular to the surface of the cover plate proximate to the liquid crystal module.

11. The display module according to claim 7, wherein the inner side face of the accommodating groove configured to be provided with the first light source is a stepped surface; and     the first light source is located on a plane of the stepped surface parallel to the groove bottom surface, and a light exit surface of the first light source is parallel to a surface of the cover plate proximate to the liquid crystal module.

12. The display module according to claim 7, wherein the first light source includes:

a flexible circuit board carrier; and at least one invisible light lamp, disposed on the flexible circuit board carrier and electrically connected to the flexible circuit board carrier.

13. The display module according to claim 12, further comprising a printed circuit board; wherein     the printed circuit board is located at a side of the liquid crystal module facing away from the cover plate, and is electrically connected to the texture sensing module.

14. The display module according to claim 1, wherein the first light source is adhesively bonded to a surface of the cover plate proximate to the liquid crystal module.

15. A display device, comprising the display module according to claim 1.

* * * * *